United States Patent [19]

Satou

[11] Patent Number: 5,471,266
[45] Date of Patent: Nov. 28, 1995

[54] DATA RECORDING APPARATUS OF CAMERA

[75] Inventor: Osamu Satou, Tokyo, Japan

[73] Assignee: Asahi Kogaku Kogyo Kabushiki Kaisha, Tokyo, Japan

[21] Appl. No.: 855,652

[22] Filed: Mar. 23, 1992

Related U.S. Application Data

[63] Continuation of Ser. No. 517,689, May 2, 1990, abandoned.

[30] Foreign Application Priority Data

May 2, 1989 [JP] Japan ................................. 1-113019

[51] Int. Cl.⁶ ................................................ G03B 17/24
[52] U.S. Cl. .......................................... 354/106; 354/212
[58] Field of Search ................................. 354/105–109, 354/21, 173.1, 173.11, 212, 215; 355/40, 41

[56] References Cited

U.S. PATENT DOCUMENTS

| | | | |
|---|---|---|---|
| 3,783,763 | 1/1974 | Whitley et al. | 354/108 |
| 3,906,523 | 9/1975 | Ogiso et al. | 354/109 |
| 3,953,868 | 4/1976 | Kawamura et al. | 354/109 |
| 4,114,169 | 9/1978 | Yamamori | 354/106 |
| 4,344,682 | 8/1982 | Hattori | 354/106 X |
| 4,493,543 | 1/1985 | Lundberg et al. | 354/109 |
| 4,493,547 | 1/1985 | Bridges | 354/106 X |
| 4,579,432 | 4/1986 | Kobayashi | 354/21 |
| 4,659,198 | 4/1987 | Beauviala et al. | 352/92 |
| 4,664,491 | 5/1987 | Kazumi et al. | 354/105 |
| 4,804,986 | 2/1989 | Ohnuki et al. | 354/212 |
| 4,816,853 | 3/1989 | Kikukawa et al. | 354/412 |
| 4,825,235 | 5/1989 | Kanai et al. | 354/106 |
| 4,860,037 | 8/1989 | Harvey | 354/21 |
| 4,974,096 | 11/1990 | Wash | 354/21 X |
| 5,003,329 | 3/1991 | Itabashi | 354/106 |
| 5,028,942 | 7/1991 | Kirigaya | 354/106 |

FOREIGN PATENT DOCUMENTS

| | | |
|---|---|---|
| 28480 | 5/1981 | European Pat. Off. . |
| 0031568 | 7/1981 | European Pat. Off. . |
| 2224127 | 4/1990 | European Pat. Off. . |
| 2486679 | 1/1982 | France . |
| 63-141034 | 6/1988 | Japan . |
| 673007 | 5/1952 | United Kingdom . |
| 672967 | 5/1953 | United Kingdom . |

OTHER PUBLICATIONS

Patent Abstracts of Japan; vol. 12, No. 401 (P–776)(3248) 25 Oct. 1988.
Nikon F–401 Image Master Control.
Copy of the Offical Action issued in regard to counterpart German Application No. P40 14 127.6–51.
English Language Translation of an Examiner's Interview Summary noted in the Official Action.

*Primary Examiner*—Howard B. Blankenship
*Attorney, Agent, or Firm*—Sandler, Greenblum and Bernstein

[57] ABSTRACT

A data recording apparatus in a camera including a data recording device for recording at least one item of data upon loading a film or commencing the photographing and data upon unloading the film or finishing the photographing, in an area of the film in which no picture is taken. A film feeding device is provided for feeding the film to a data recording position in which the data is recorded.

8 Claims, 10 Drawing Sheets

DATA RECORDING APPARATUS OF CAMERA

This application is a continuation, of application Ser. No. 07/517,689, filed May 2, 1990, now abandoned.

BACKGROUND OF THE INVENTION

1. Field of the Invention

The present invention relates to an apparatus for recording data, such as a film loading date and a time, or a film unloading date and time onto the film.

2. Description of Related Art

There is a known data recording apparatus in which date and time when a picture of an object is taken is recorded in the same picture plane, as disclosed, for example, in Japanese Unexamined Patent Publication Nos. 61-259244 and 61-267746. In such a known apparatus, the photographing date and time are usually recorded in a lower right or left corner of a picture plane.

However, in the known data recording apparatus in which the photographing date and time of each picture of an object to be taken can be easily identified, there is no way to learn when a first picture of one film is taken and when a last picture of the same film is taken or the photographing order of two or more than two films.

SUMMARY OF THE INVENTION

The primary object of the present invention is to provide a data recording apparatus of a camera in which data, such as a film loading date (and/or time), a first picture taking date (and/or time), a last picture taking date (and/or time), a film unloading date (and/or time) is recorded in a frame of film in which no picture is taken, i.e. in a non-photographing area of a film.

To achieve the object mentioned above, according to the present invention, there is provided a data recording apparatus of a camera which records data on a film, comprising data forming mechanism for forming at least one of data relating to the loading of the film or commencing the photographing and data relating to unloading or rewinding the film or finishing the photographing and a data recording means for recording said data formed by said forming means in an area of the film in which no picture is taken is provided.

With this construction, since one or both of the data relating to loading the film and the data relating to finishing the photographing is or are recorded in the non-photographing area of the film, the data for the commencement of the photographing and the completion of the photographing can be easily confirmed.

Preferably, the non-photographing area is defined by a frame which is immediately before the first frame which is usually and automatically set in a normal automatic loading, or which is a frame after a predetermined number of photographing frames depending on the film. This enables the necessary data to be recorded in the non-photographing area in which no picture is taken. Namely, the required data has no effect on the photographing frames of the film in which pictures are taken.

If the data is date and/or time, the time when the first and last pictures are taken can be easily learned.

When the data relating to loading the film and the data relating to finishing the photographing are located in the same frame, as to be adjacent to each other, both data can be confirmed at one time.

BRIEF DESCRIPTION OF THE DRAWINGS

The invention will be described below in detail with reference to the accompanying drawings, in which.

DESCRIPTION OF PREFERRED EMBODIMENTS

Figure 1:
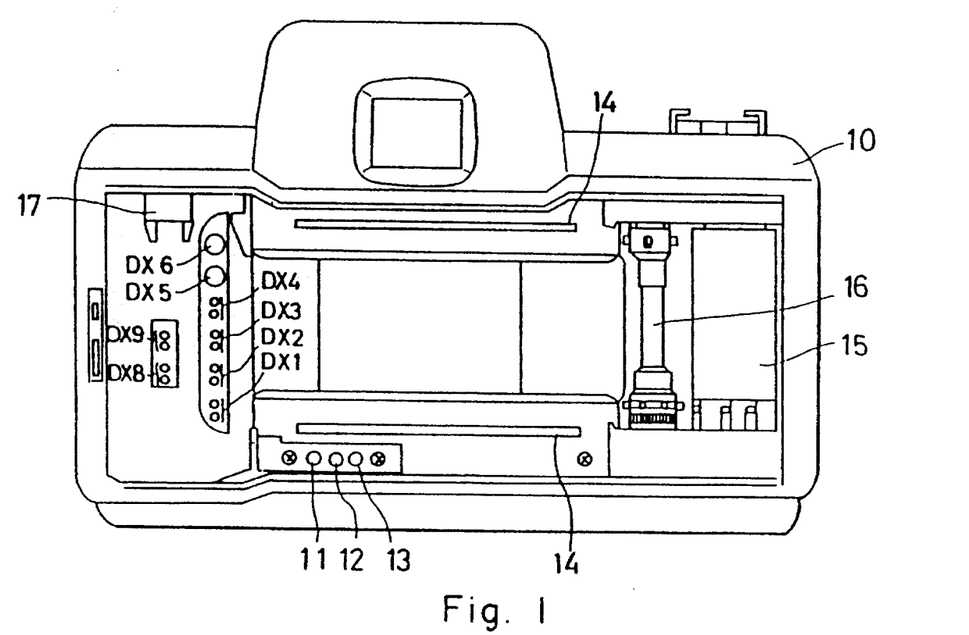
FIG. 1 is a back view of the inside of a camera body having a data recording apparatus, according to the present invention.
Figure 2:
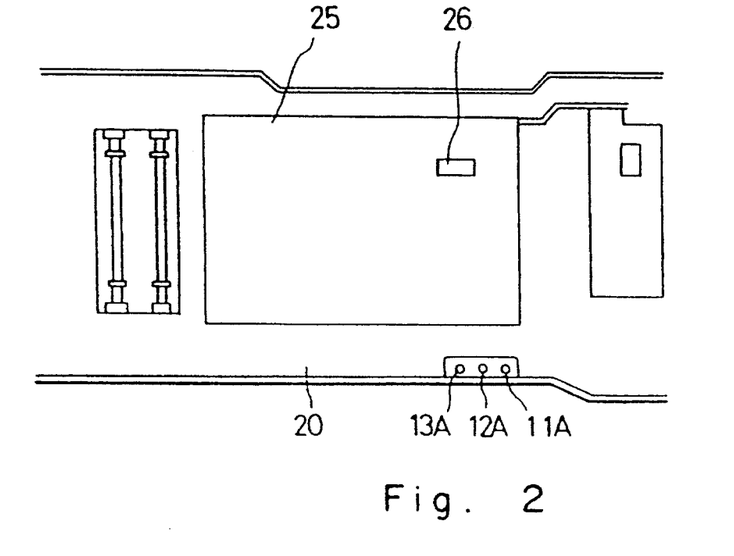
FIG. 2 is an inside view of a back cover of a camera shown in FIG. 1.
Figure 3:
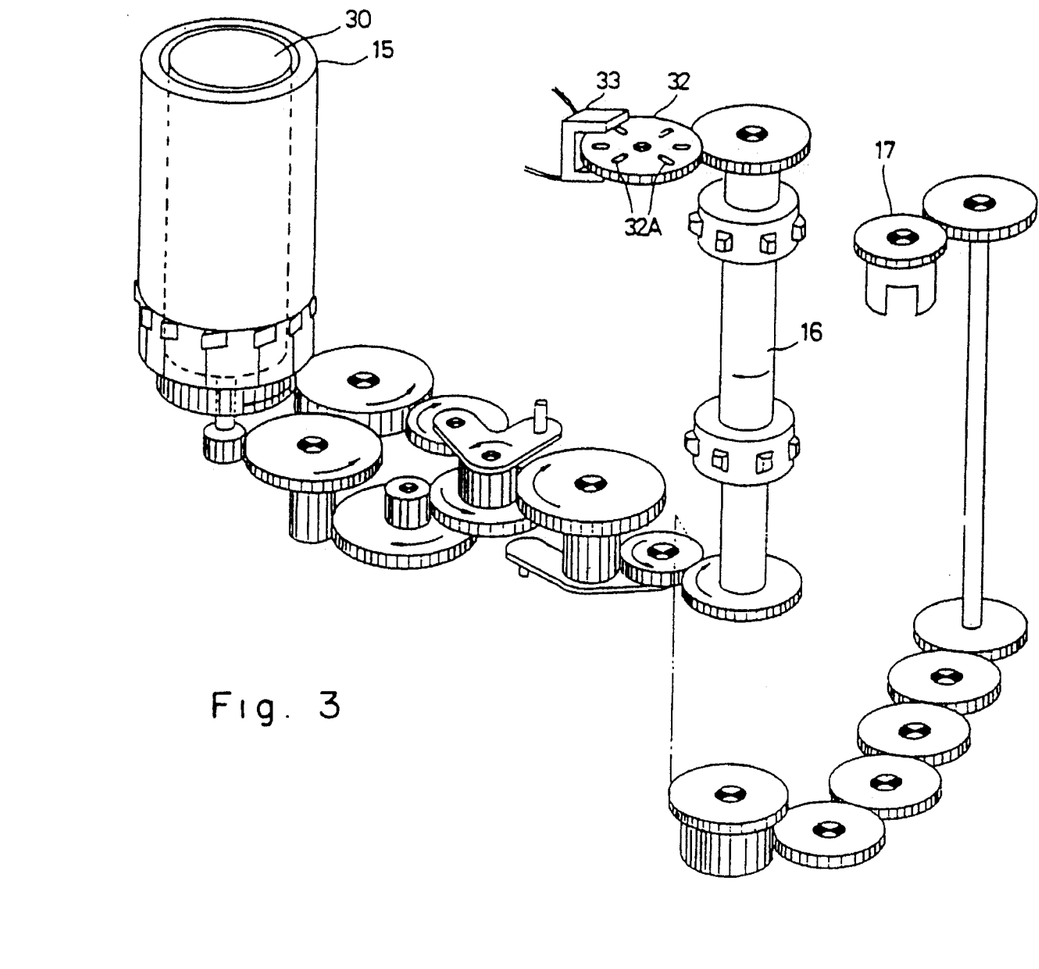
FIG. 3 is a schematic view of a pulse outputting mechanism which outputs pulses when a film is advanced.

First, with reference to FIGS. 1 through 3, in a camera body 10 there are provided electrical contacts 11, 12 and 13 which supply electrical power and control signals to a data recording apparatus provided on aback cover 20 (FIG. 2), and DX contact pins DX1~DX9 which are connected to DX code areas provided on a patrone surface of a film. As is well known, the DX codes include information, such as an ISO sensitivity of a film, the number of frames in which pictures can be taken, and latitude data, etc. The DX contact pins DX8 and DX9 are used to read the number of film frames and are electrically connected to the corresponding areas relating to the number of film frames among the DX code areas.

On the back cover 20 are provided contacts 11A, 12A and 13A corresponding to the contacts 11, 12 and 13 of the camera body 10, so that when the back cover 20 is closed, the contacts 11A, 12A and 13A on the back cover are connected to the corresponding contacts 11, 12 and 13 on the camera body to transmit electrical power and signals therebetween.

The back cover 20 is provided on its inner side face with a pressure plate 25 which keeps the film flat upon the advance thereof. The pressure plate 25 has a window 26 for recording data (date) via through the data recording apparatus. Consequently, the date is exposed and recorded on the film through the window 26.

The camera body 10 has a film winding spool 15, guide rails 14 which ensure a stable and smooth travel of the film, and a sprocket 16 which rotates a slit disc 32 for detecting the displacement (quantity of advance) of the film. The arrangement of these elements are illustrated in FIG. 3. The operation of film winding and rewinding mechanism utilizing the elements shown in FIG. 3 is fully described in Ser. No. 301,362 filed Jan. 1, 1989 the disclosure of which is incorporated herein by reference.

A film winding and rewinding motor 30 is provided in the film winding spool 15, so that when the motor 30 rotates, the sprocket 16 is rotated in the film winding through the spool 15 upon winding of the film. On the other hand, upon rewinding the film, the spool 15 is disengaged from the sprocket 16, so that a rewinding shaft 17 is rotated in the film rewinding direction.

When a film is loaded in the camera body 10, upon winding, the spool 15 rotates to wind the film, so that the slit disc 32 is rotated through the sprocket 16 which engages with perforations of the film to rotate together. The slit disc 32 has radial slits 32A spaced from one another at predetermined angular distance. The slits 32A successively pass a detection space between a light receiver and a light emitter of a photointerrupter 33.

Upon rewinding, the film is rewound, by the rewinding shaft 17, back into the casette, so that the sprocket 16 which engages with the perforations of the film is rotated to rotate the slit disc 32. As a result, the photointerrupter 33 generates pulses, the number of which corresponds to the number of revolution of the slit disc 32. One pulse corresponds to one perforation of the film. Thus, the advance of the film and the displacement amount advance displacement thereof can be detected by the pulses and by the number of pulses, respectively.

Figure 4:
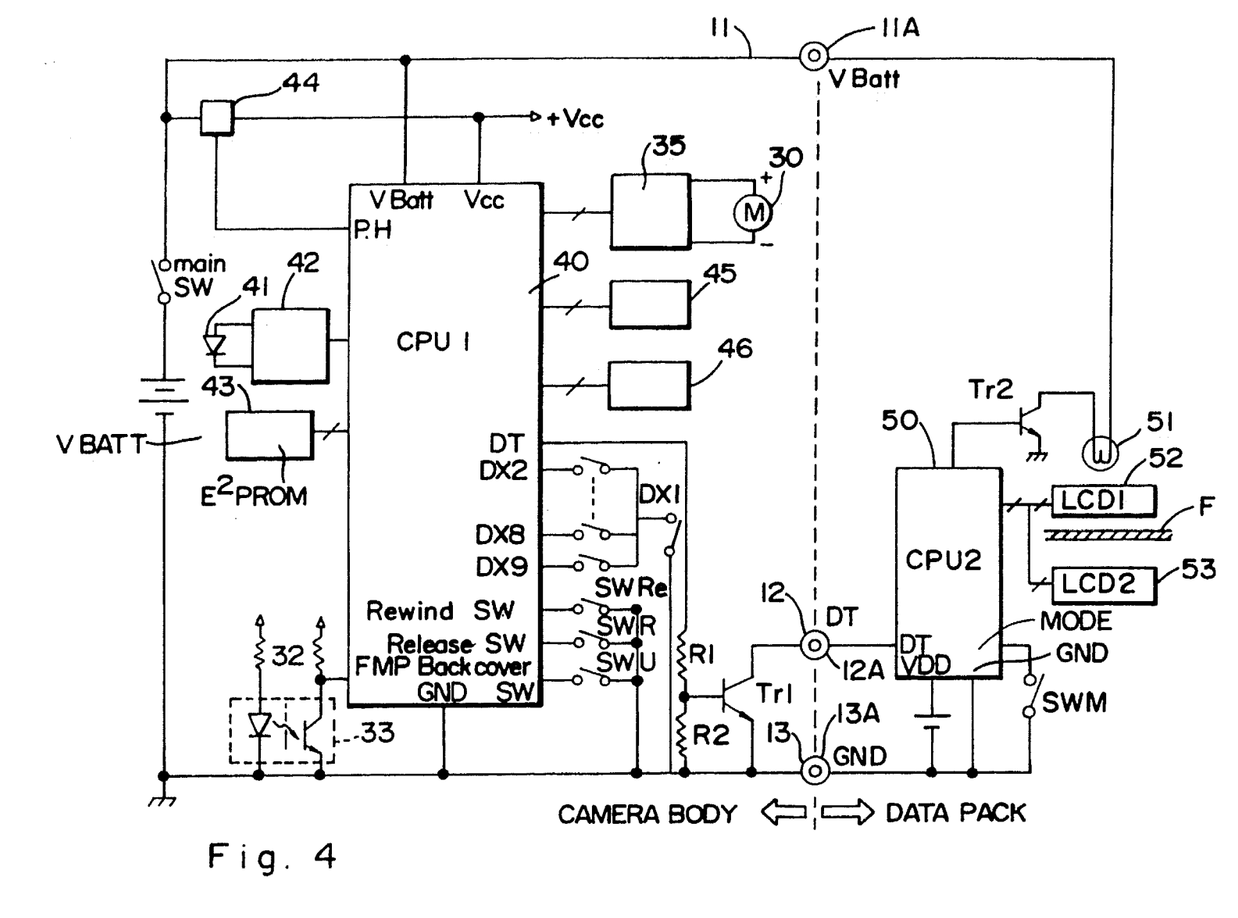
FIG. 4 is a block diagram of a control system of a data recording apparatus, according to the present invention.

FIG. 4 schematically shows a block diagram of a control system of a data recording apparatus of a camera according to an embodiment of the present invention.

FIG. 4, a main CPU 40 which is provided in the camera body 10 operates when a main switch SW is turned ON. To the main CPU 40 is connected a photometering circuit 42 which logarithmically compresses the detection signal issued from a light receiver 41 which detects the luminance of an object to be photographed and amplifies the same to convert the analog signal to a digital signal (A/D conversion). The luminance signal input to the main CPU 40 from the photometering circuit 42 is one of operational factors which determine the diaphragm value and the shutter speed, upon releasing of the camera shutter.

An E$^2$PROM 43 temporarily memorizes the photographing data of the camera. The stored data is data which is used to arithmetically calculate the luminance etc.

The pulse signal issued from the photointerrupter 33 is input to an FMP terminal of the main CPU 40, so that the main CPU 40 recognizes the feed (advance) of the film in accordance with the pulse signal.

The rotational direction and the stopping of the winding and rewinding motor 30 are controlled by a motor driver 35 which operates in accordance with the command of the main CPU 40 to operate the winding and rewinding motor 30 in the winding or rewinding directions. The main CPU 40, the spool 16, the winding and rewinding motor 30, and the motor driver 35 etc. constitute a film feeding (advancing) means.

The main CPU 40 outputs an indication signal to a display 45 which indicates set camera modes or the state of film feed, etc. in accordance with the indication signal.

The main CPU 40 performs an arithmetic operation to determine the exposure value and a shutter speed in accordance with the luminance signal of the photometering circuit 42 and the ISO sensitivity of the film, etc. As a result, an exposure control apparatus 46 is actuated in accordance with the result of the arithmetic operation to drive the shutter (not shown) and the diaphragm (not shown).

Various switches, such as a back cover switch SWU which is turned ON when the back cover 20 is closed, a release switch SWR which is turned ON when the release button is actuated, and a film rewinding switch SWRe which is actuated to rewind the film, etc. are connected to the main CUP 40. The main CPU 40 performs the associated positions in accordance with the operations of these switches.

The DT terminal of the main CPU 40 is connected to the contact 12 through pull-up resistances R1 and R2 and a transistor Tr1 to control the data recording operation.

The input ports DX2~DX9 of the main CPU 40 are connected to the DX contact pins DX2~DX9. The main CPU 40 detects the number of film frames and the ISO sensitivity Sv in accordance with the input levels of the input ports DX2~DX9. A regulator 44 supplies the electrical power to the main CPU 40 when the PH terminal of the main CPU 40 is set to be "L" level. The DX contact pin DX1 is connected to the ground (GND).

The back cover 20 is provided with a sub-CPU 50 which controls the data recording operation. The sub-CPU 50 contains a data recording LCD (liquid crystal display) 52 which records data, such as date data on the film F and a lamp 51. The lamp 51 is turned ON and OFF by the sub-CPU 50 through a power transistor Tr2.

In the data recording LCD 52, data to be recorded is formed by a light transmission portion, so that light emitted from the lamp 51 is transmitted through the light transmission portion of the data recording LCD 52 to be incident upon the film F, so that the data formed by the light transmission portion is exposed on the film F. The sub-CPU 50 and the LCD 52 constitute a data forming means and the main CPU 40, sub-CPU 50 and the lamp 51 constitute a data recording means.

The sub-CPU 50 causes the lamp 51 to emit light in response to the signal output from the DT terminal of the main CPU 40.

An indicating LCD 53 is provided on the outer face of the back cover 20 to easily confirm the data to be recorded.

Figure 5:
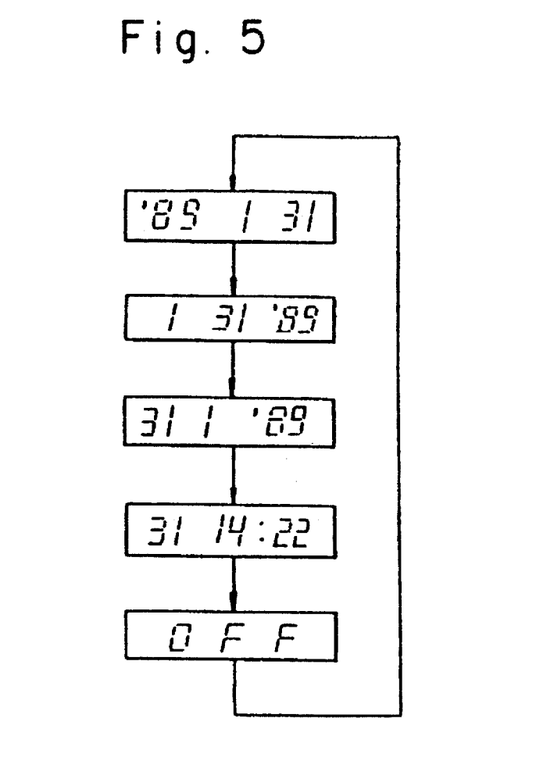
FIG. 5 is a schematic view of display modes of dates which can be set in a camera, according to the present invention.

The switch SWM outputs a signal for changing the indication modes of data to the sub-CPU 50. The sub-CPU 50 successively changes the indication modes of date data in the order shown in FIG. 5 every time the switch SWM is pushed down. For example, when the switch SWM is pushed down, the indication mode is changed from "'89 1 31" (year, month, date) to "1 31 '89" (month, date, year). From this position, if the switch SWM is pushed down three times, the indication becomes "OFF". In the "OFF" mode, no date is recorded on the film. Note that "31 14 : 22" in FIG. 5 designates "twenty two minutes past two o'clock in the afternoon on the date of 31".

The following discussion will be directed to the data recording operation according to an aspect of the present invention.

When the back cover 20 is closed after the film F is loaded, the back cover switch SWU is turned on, so that electrical power is supplied to the main CPU 40.

The main CPU 40, which checks if the back cover switch SWU is ON, drives the winding and rewinding motor 30 to wind the film F. The main CPU 40 counts the number of pulses issued by the photointerrupter 33 to check the amount of winding of the film. When the number of pulses reaches a predetermined value, the winding and rewinding motor 30 is stopped. In the illustrated embodiment, the film is wound up until 1.5 frames before the first photographing frame which is usually set by the automatic loading mechanism.

Upon completion of the film winding, the data recording apparatus operates to record date data in an indication mode selected by the switch SWM. The date data is recorded in the lower left end of the film frame F, as shown at A in FIG. 7.

When the date data is recorded on the film F, the main CPU 40 makes the winding and rewinding motor 30 ON again to wind the film F until the film comes to the normal first frame, in accordance with the number of pulses issued from the photointerrupter 33. Thus, the camera is ready for photographing.

Figure 7:
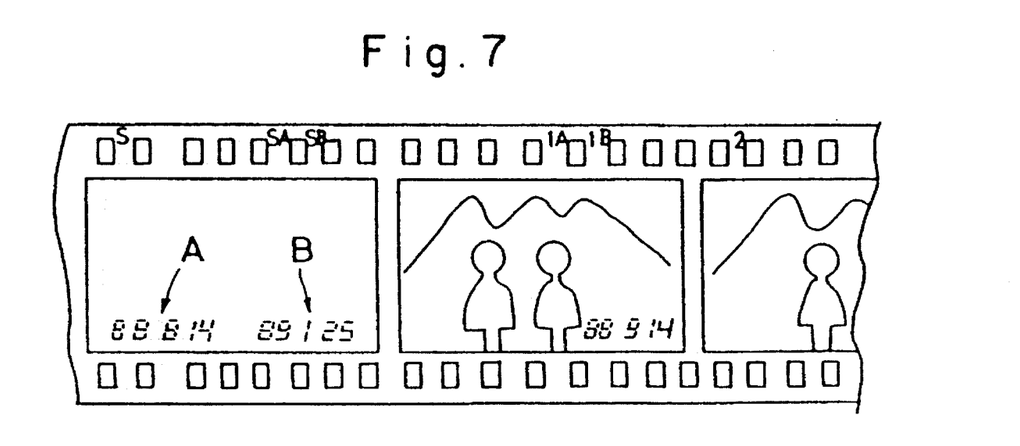
FIG. 7 is a schematic view showing how data (photographing date, etc.) is recorded in a picture plane by a data recording apparatus, according to the present invention.

Thereafter, every time the release switch SWR is turned ON, the date data is recorded in the lower right end of the exposed picture plane, as shown in FIG. 7.

When the rewinding switch SWRe is turned ON, upon completion of photographing, the main CPU 40 drives the winding and rewinding motor 30 in the rewinding direction to rewind the film F to a predetermined position, i.e. until the frame in which the date has been recorded upon loading the film appears, in accordance with the number of pulses issued from the photointerrupter 33.

When the film rewinding is finished, the data recording apparatus operates to record the date data in an indication mode selected by the switch SWM. The date data is taken in the lower right end of the frame in which the date data A has been recorded upon loading of the film F, as shown at B in FIG. 7.

When the date data is recorded on the film, the winding and rewinding motor 30 is rotated again in the rewinding direction. Thereafter, when no pulse is issued from the photointerrupter 33, the winding and rewinding motor 30 is stopped. After issuance of the pulses is stopped, the film F can be completely wound in the cassette for a predetermined time.

Thus, upon loading the film, the film loading date is recorded in the lower left end of a frame immediately before the first frame which is usually used for normal photographing. During photographing, the date data is recorded in the lower right end of the picture frame, similar to a conventional camera. After pictures of a predetermined number of frames are taken, when the film is rewound, the film unloading date is recorded in the lower right end of the frame in which the film loading date has been recorded.

The following explanation will be directed to the operations of the data recording apparatus (particularly see FIGS. 8 through 11). The operations are performed by the main CPU 40, in accordance with the program stored in the internal ROM of the main CPU 40.

Figure 8A:
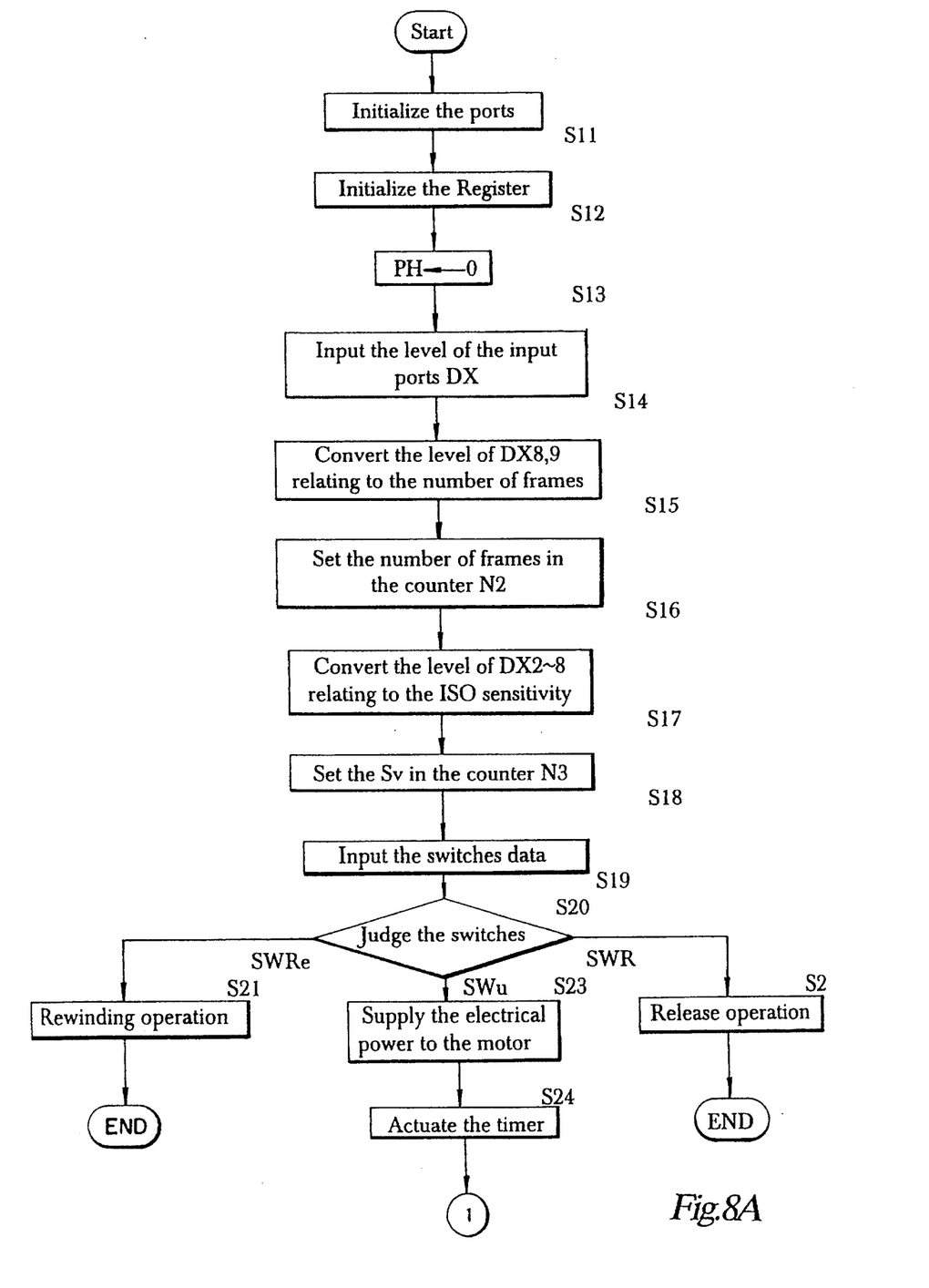
FIGS. 8A and 8B are flow charts of an automatic film loading operation and a data recording operation upon loading a film.
Figure 8B:
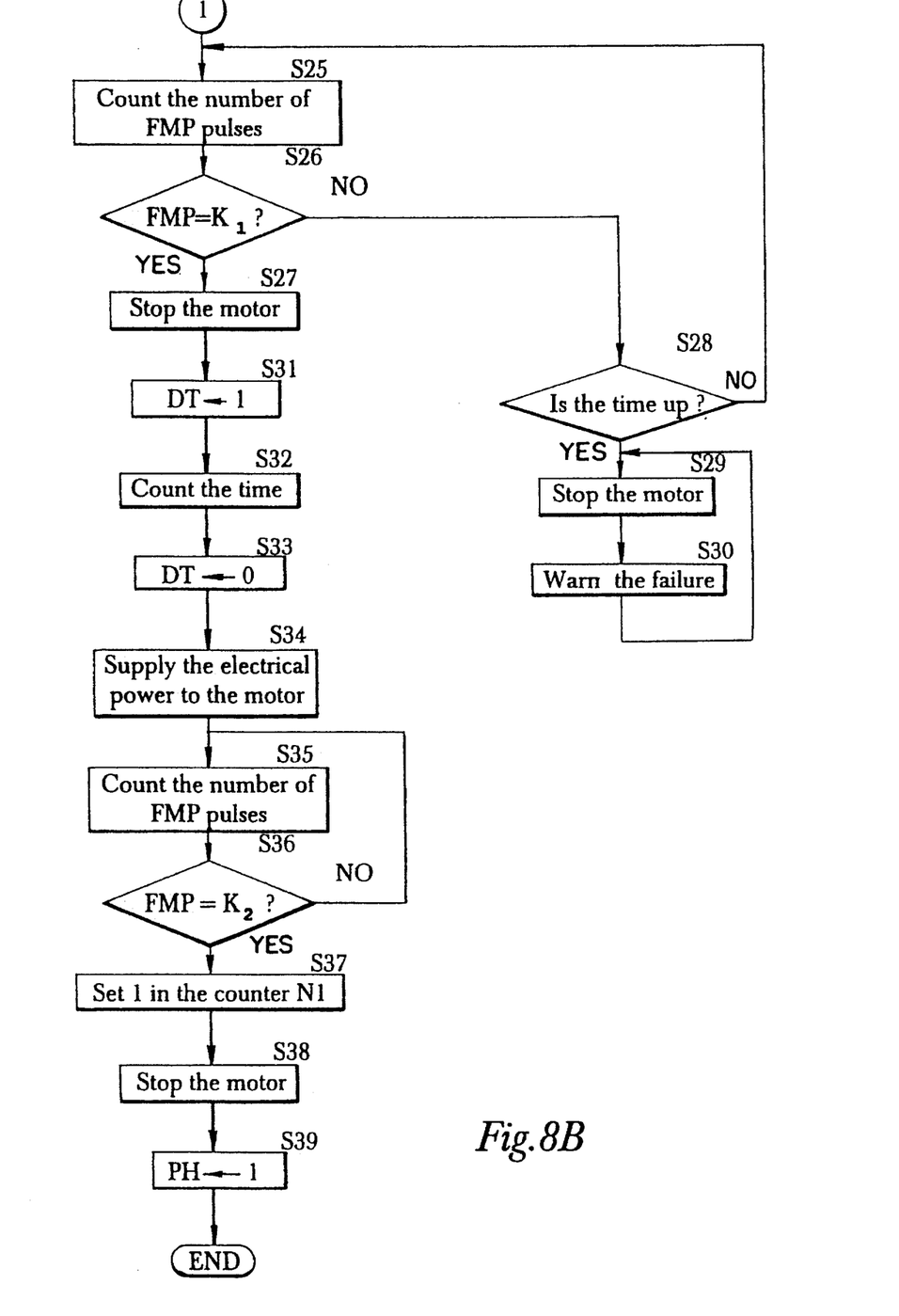

FIGS. 8A and 8B show operations upon loading of the film.

When the back cover 20 is closed after the film F is loaded, the back cover switch SWU is turned ON to start the programmed operations. The main CPU 40 initializes the ports (terminal) and the register of the CPU (steps S11 and S12), and sets the output of the PH terminal to the "L" level, so that the electrical power is supplied from the regulator 44 (step S13).

The main CPU 40 inputs the level of the input ports DX2–DX9 (step S14), and converts the level of the input ports DX8 and DX9, relating to the number of frames on the film which is prestored in the memory of the main CPU 40, to be set in a counter N2 of the E$^2$PROM 43 (steps S15 and S16). Furthermore, the level of the input ports DX2–DX7 is converted to the ISO sensitivity which is prestored in the memory of the main CPU 40 to be set in a counter N3 of the E$^2$PROM 43 (steps S17 and S18).

The main CPU 40 detects when a switch is turned ON, from among the switches, in accordance with the switch data input thereto (steps S19 and S20). At step S20, if the rewinding switch SWRe is ON, the rewinding operation is performed (step S21). If the release switch SWR is ON, the release operation is performed (step S22). Thereafter, the control ends.

If the main CPU 40 judges that the electrical power is supplied by the back cover switch SWU, the main CPU 40 sends a command signal to the motor driver 35 to actuate the same and actuate the timer, so that the winding and rewinding motor 30 is rotated in the winding direction to commence the loading of the film, i.e. the winding of the film F (steps S23 and S24).

When the winding of the film is commenced, the sprocket 16 rotates, as mentioned above. As a result, the slit disc 32 rotates, so that the photointerrupter 33 alternately and periodically issues "H" and "L" signals in accordance with the slits 32A. Thus, the pulses are periodically generated from the photointerrupter 33. The pulses are sent to the main CPU 40 through the FMP terminal thereof to count the number of pulses in order to check the counted number (step S25).

When the number of pulses is K1, the winding and rewinding motor 30 is stopped to stop the winding of the film F (steps S25–S28). The number K1 is the number of pulses necessary for advancing the film F to the data recording position. Therefore, the film F is wound until the data recording position comes to a lower left end of a frame immediately before the first frame, that is, until it comes to one and half (1.5) frames before the first frame used in normal photographing.

The reason that the timer starts at step S24 is that if the film F fails to be advanced during the winding operation thereof, for some reason (for example, no film F is wound, i.e. no pulse is input to the FMP terminal of the main CPU 40), the winding and rewinding motor 30 is stopped to prevent a possible overload of the motor 30. The failure is detected, when time of the timer is up, so that the main CPU 40 stops the winding and rewinding motor 30 to warn of the failure. These operations are repeated until the back cover switch SWU is made OFF (steps S28–S30).

When the film F is wound to the data recording position, the main CPU 40 turns the DT terminal ON ("H" level) to turn the transistor Tr1 ON, so that the contact 12 becomes "L" level. As a result, a data recording command is given to the DT terminal of the sub CPU 50. In response to the command signal, the sub-CPU 50 causes the LCD 51 to indicate desired information and the lamp 52 to emit light.

During these operations, the main CPU 40 waits for the operation for a predetermined time and then turns the DT terminal OFF ("L" level) at steps S31–S33. Thus, the film loading date data is recorded in the picture, as shown in FIG. 7.

The main CPU 40 then commences the supply of the electrical power to the winding and rewinding motor 30 through the motor driver 35 in the film winding direction to count the number of pulses input from the FMP terminal in order to set the film at the first frame for normal photographing.

When the number of pulses input from the FMP terminal is K2, that is, when the film F is advanced by a displacement corresponding to one and half (1.5) frames from the data recording position, the counter N1, which counts the number of frames of the film F, of the $E^2PROM$ 43 is set at 1, to stop the power supply to the winding and rewinding motor 30 and to set the PH terminal at the level H. Thus, the power supply to the main CPU 40 is stopped to end the operation (steps S34~S39). Thereafter, the control waits until the release switch SWR is pushed down.

Figure 9:
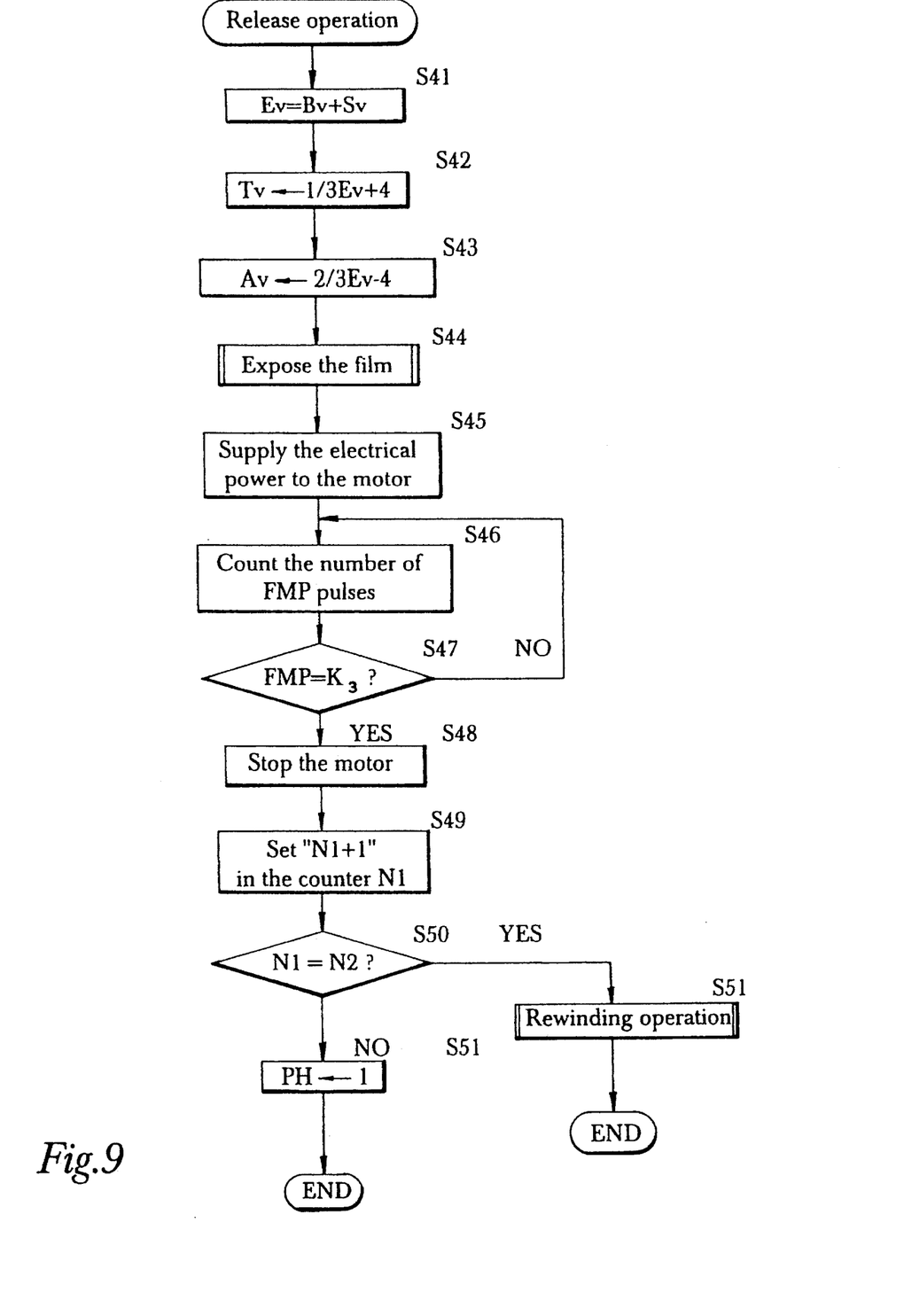
FIG. 9 is a flow chart of a release operation of a camera according to one aspect of the present invention.

FIG. 9 shows a flow chart of the release operation.

Figure 6:
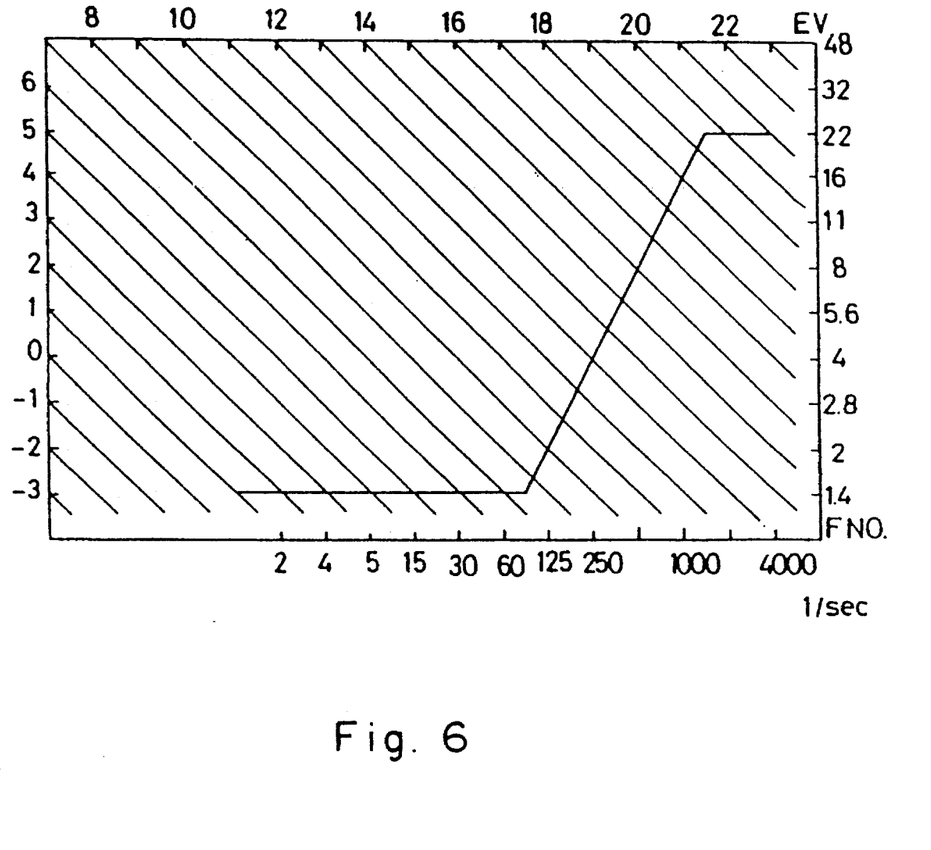
FIG. 6 is a program diagram showing a relationship between the quantity of light emitted from a lamp and a luminance of an object.

When the release switch SWR is turned ON to commence the photographing, the main CPU 40 performs the program operation (refer to FIG. 6) to obtain the shutter speed Tv and the diaphragm value Av in accordance with the object luminance Bv detected by the light receiver 41 at steps S41~S43, and operates the exposure control apparatus 46 in accordance with the result of the program operation to actuate the diaphragm and the shutter, thereby to expose the film (step S44). The operation of a camera having a program operation as illustrated in FIG. 6 is fully described in Ser. No. 473,044 filed Jan. 31, 1990 the disclosure of which is incorporated herein by reference.

Upon completion of exposure, the main CPU 40 supplies the electrical power to the winding and rewinding motor 30 through the motor driver 35 to rotate the motor 30 in the film winding direction (step S45).

Thereafter, the main CPU 40 counts the number of pulses which are generated from the photointerrupter 33 to be input thereto through the FMP terminal. When the number of pulses becomes K3, namely, when the film F is wound by one frame, the power supply to the winding and rewinding motor 30 is stopped to increase the counter N1 of the $E^2PROM$ 43 which counts the number of frames by one increment (steps S46~S49).

The main CPU 40 checks if the increased value of the counter N1 is equal to the value of the counter N2 at step S50. If the increased value is not equal to the value of the counter N2, the control proceeds to step S51 in which the terminal PH is set at "H" to stop the power supply to the main CPU 40, and then, the operation ends. At step S50, if the increased value is equal to the value of the counter N2, the rewinding operation is performed at step S52, since the picture of the last available frame has been already taken.

Figure 10:
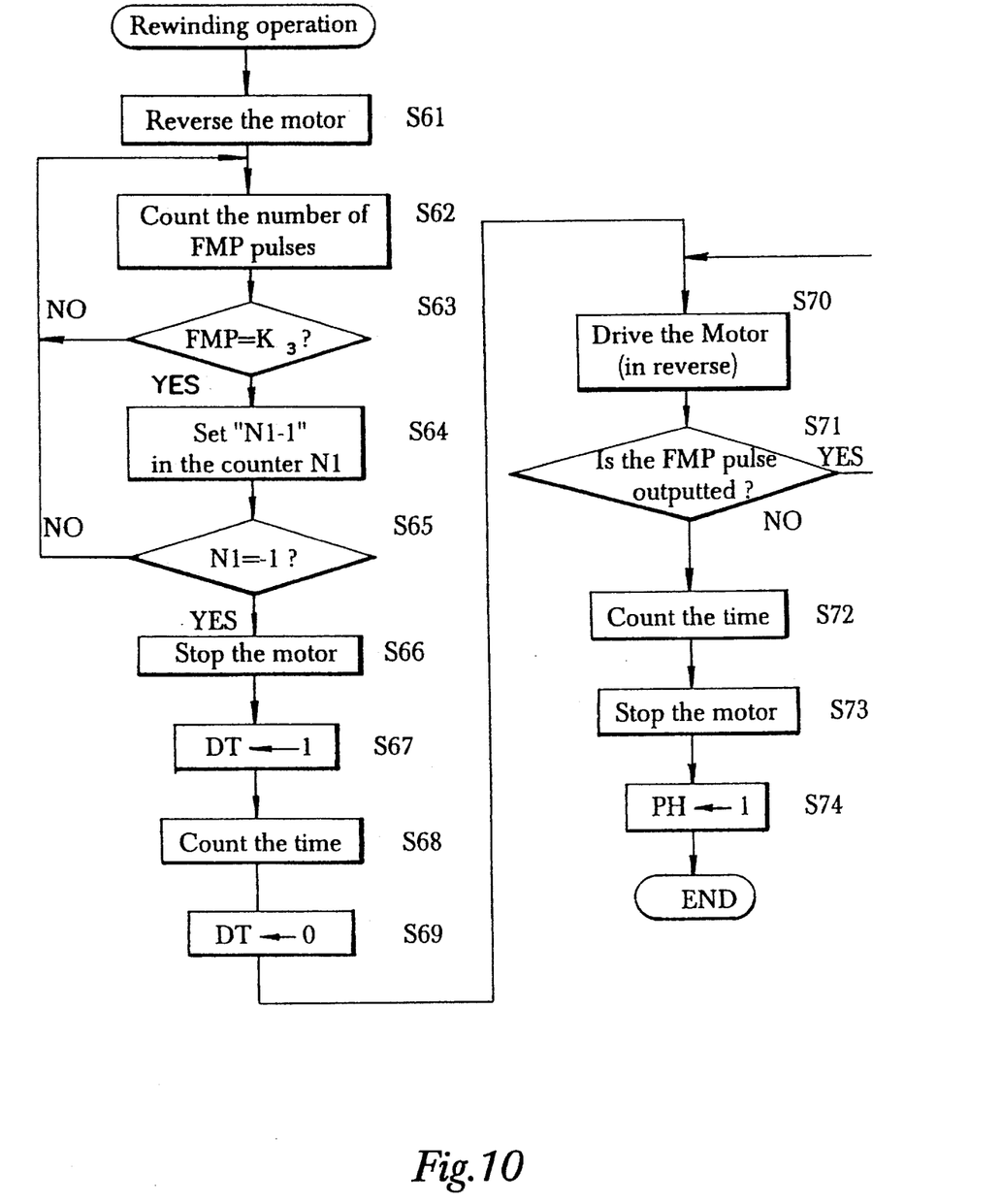
FIG. 10 is a flow chart of a film rewinding operation and a data recording operation upon completion of photographing.

FIG. 10 shows a flow chart of the rewinding operation which is performed at step S21 and step S51 mentioned above. When pictures of all the frames are taken, or when the rewinding switch SWRe is manually made turned ON by a photographer, the control proceeds to the rewind routine shown in FIG. 10.

The main CPU 40 reverses the winding and rewinding motor 30 in the rewinding direction to rewind the film F (step S61). The main CPU 40 counts the number of pulses which are issued from the photointerrupter 33 and which are input to the main CPU 40 through the FMP terminal. When the counted number becomes K3, the value of the counter N1 of the $E^2PROM$ 43 is decreased by one decrement (steps S62~S64).

The above mentioned operations are repeated until the value of the counter N1 is −1, that is, until the data recording position comes to the lower right end of the frame in which the film loading date has been recorded (steps S62~S65).

When the value of the counter N1 is −1, the main CPU 40 stops the power supply to the winding and rewinding motor 30 and makes the DT terminal ON (level "H") to give the data recording command signal to the sub-CPU 50. In response to the command signal, the sub-CPU 50 causes the lamp 52 to emit light. During these operations, the main CPU 40 counts the time in which the DT terminal is on and that turns the DT terminal OFF.

Thus, upon rewinding, the date data is recorded in the picture, as shown at B in FIG. 7 (steps S66~S69).

To completely rewind the film F, the main CPU 40 commences the power supply to the winding and rewinding motor 30 through the motor driver 35. In accordance with the change in pulse input to the main CUP 40 through the FMP terminal, the main CPU 40 stops the power supply to the winding and rewinding motor 30 at a predetermined time after no issuance of pulse and turns the PH terminal OFF (level "H"), so that the power supply to the main CPU 40 is stopped (steps S70~S74).

Although, in the illustrated embodiment, the date data is taken recorded in the lower right end of the picture plane, it is possible to record the date data in the lower left end thereof.

Figure 11:
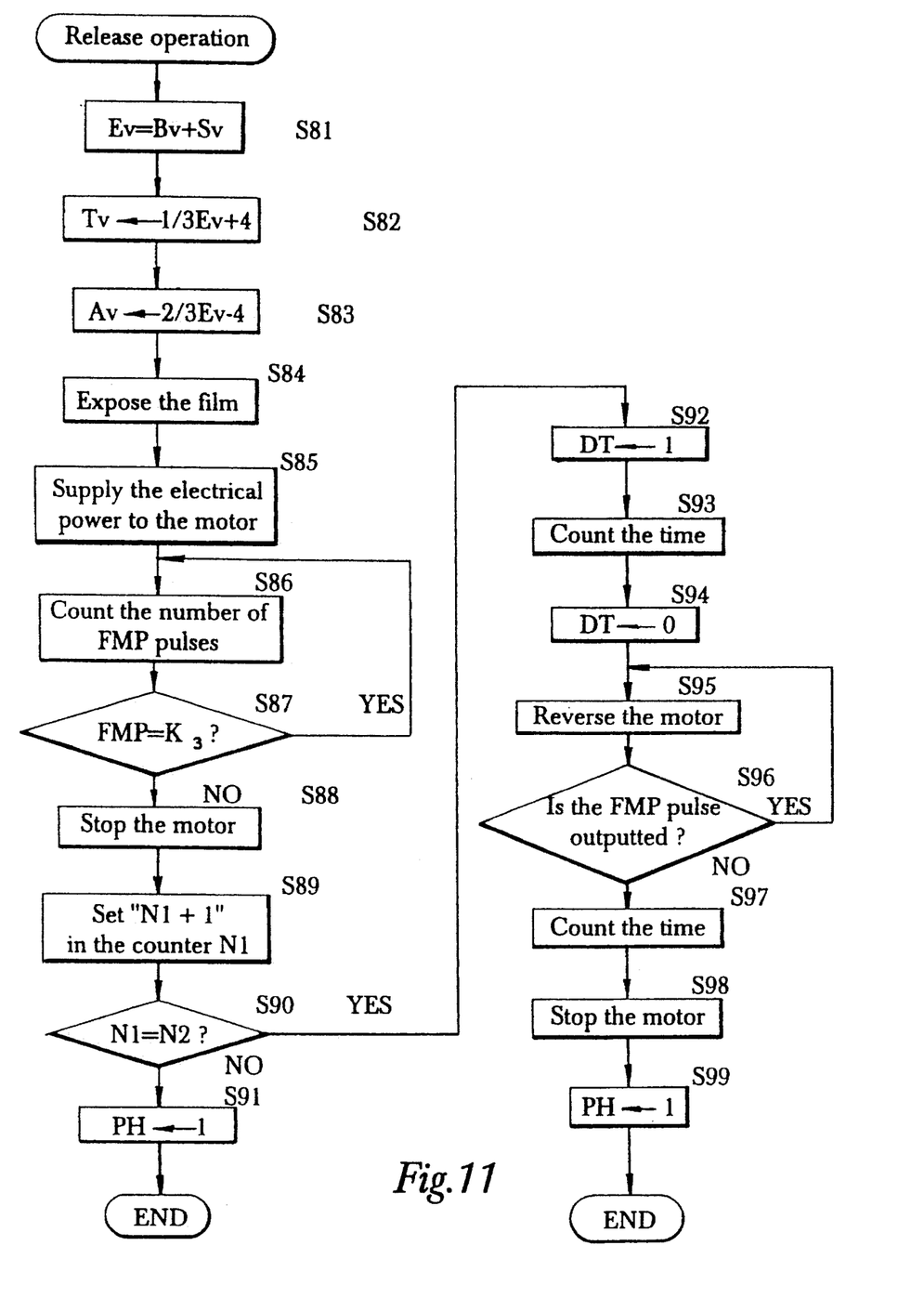
FIG. 11 is a flow chart of a release operation, a data recording operation upon completion of photographing and a film rewinding operation, according to another aspect of the present invention.

The position and the frame in which the date data is to be recorded are not limited to those in the illustrated embodiment mentioned above and can be optionally set. For example, the date data can be taken recorded in a predetermined frame member by reading the DX code data relating to the number of frames. FIG. 11 shows a flow chart of operations for such an alternative.

The exposure and film winding operations of steps S81~S89 are the same as those of steps S41~S49 in FIG. 10.

When the film is wound by one frame upon completion of the release operation, the value of the counter N1 which is increased by one increment is compared with the value of the counter N2 (steps S89 and S90). If the values are not identical to each other, or if the increased value of the counter N1 is smaller than the value of the memory N2, since photographing of the last frame has not yet been performed, the PH terminal is set at "H" to stop the power supply to the main CPU 40 to end the operation (step S91).

On the other hand, if the increased value of the counter N1 is equal to the value of the counter N2, since the picture of the last frame has been taken, the DT terminal is set at "H" to make the lamp 51 ON, thereby to commence the data recording operation and to start the timer to measure the exposure of the data recording operation time. When time of the timer is up, the DT terminal is set at "L" to make the lamp 51 OFF, thereby to end the data recording operation (steps S92~S94).

Upon completion of the data recording operation, the winding and rewinding motor 30 is reversed in the rewinding direction to completely rewind the film F. The control waits until there is no change in output level of the FMP terminal (steps S95 and S96).

When there is no change in level of the FMP terminal, after the film F is completely rewound into the cassette, the power supply to the winding and rewinding motor 30 is stopped. The PH terminal is set "H" to stop the power supply to the main CUP 40 in order to end the operation.

Thus, the data when the film F is loaded is recorded in a frame before the first frame and the data when photographing is finished is recorded in a frame subsequent to a predetermined last frame. When the rewind switch SWRe is made ON during taking a roll of pictures, the rewinding operation shown in FIG. 10 is performed.

Although data to be recorded is date data in the illustrated embodiment, the present invention is not limited thereto. For example, marks represented by letters, such as alphabet indicia can be recorded as data. In this alternative, initials of photographers, places in which pictures are photographed, or an identification mark relating to the film can be recorded.

As can be understood from the above discussion, according to the present invention, since data when the film is loaded and unloaded is recorded in a desired frame of the film in which no picture is taken, the data can be easily recognized.

If the data is date data, a photographer can easily learn the period of photographing (when first and last pictures are taken).

Furthermore, if no data should be recorded in a picture, the present invention can be advantageously used, since data is recorded in a not-photographing frame of a film in which no picture is taken, according to the present invention.

I claim:

1. A data recording apparatus of a camera, wherein the apparatus records data on a film, said apparatus comprising:
   first detecting means for detecting loading of the film;
   first recording means for recording data regarding loading of the film in a first predetermined frame, based upon said first detecting means detecting loading of the film;
   second detecting means for detecting rewinding of the film;
   second recording means for recording data regarding rewinding of the film in a second predetermined frame, based upon said second detecting means detecting rewinding of the film.

2. The data recording apparatus according to claim 1, wherein said first and second predetermined frames are the same frame.

3. The data recording apparatus according to claim 1, said first predetermined frame comprising a frame prior to a first frame in which a photographic image is formed.

4. The data recording apparatus according to claim 1, said second predetermined frame comprising a frame after a last frame in which a photographic image is formed.

5. The data recording apparatus according to claim 1, further comprising means for selecting a data format for said data recorded in said first and second predetermined frames.

6. The data recording apparatus according to claim 1, further comprising means for recording data in each frame in which a photographic picture image is taken by a camera shutter release operation.

7. The data recording apparatus according to claim 1, further comprising film feeding and rewinding means for feeding and rewinding the film in association with said first and second detecting means.

8. The data recording apparatus according to claim 1,
   said first recording means records said data regarding loading of the film when said first detecting means detects loading of the film; and said second recording means records said data regarding rewinding of the film when said second detecting means detects rewinding of the film.

* * * * *

UNITED STATES PATENT AND TRADEMARK OFFICE
CERTIFICATE OF CORRECTION

PATENT NO. : 5,471,266
DATED : November 28, 1995
INVENTOR(S) :
Osamu SATOU

It is certified that error appears in the above-indentified patent and that said Letters Patent is hereby corrected as shown below:

On the title page, item [56], "References Cited", "U.S. PATENT DOCUMENTS", insert ---4,814,802  3/1989 Ogawa..........354/105---.

On the title page, item [56], "References Cited", "U.S. PATENT DOCUMENTS", column 2, line 1, change "4,825,235" to ---4,825,233---.

On the title page, item [56], "References Cited", "FOREIGN PATENT DOCUMENTS", insert ---3203564  8/1983 Germany---.

On the title page, item [56], "References Cited", "FOREIGN PATENT DOCUMENTS", change "5/1953" to ---5/1952 ---.

Signed and Sealed this

First Day of October, 1996

*Attest:*

BRUCE LEHMAN

*Attesting Officer*   *Commissioner of Patents and Trademarks*